W. Riley,
Fly Trap,

Nº 20,091. Patented Apr. 27, 1858.

UNITED STATES PATENT OFFICE.

WM. RILEY, OF CAMDEN, MISSISSIPPI.

FLY-TRAP.

Specification of Letters Patent No. 20,091, dated April 27, 1858.

*To all whom it may concern:*

Be it known that I, WILLIAM RILEY, of Camden, in the county of Madison and State of Mississippi, have invented a Trap for Catching Flies; and I do hereby declare that the following is a full, clear, and exact description of the construction and operation of the same, reference being had to the annexed drawings, making a part of this specification, in which—

Figure 1:
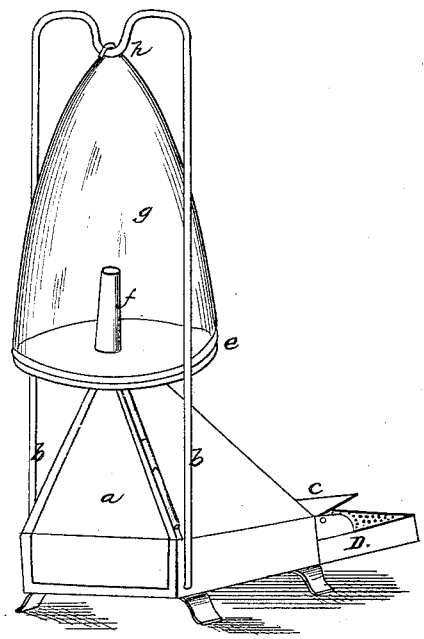
Figure 2:
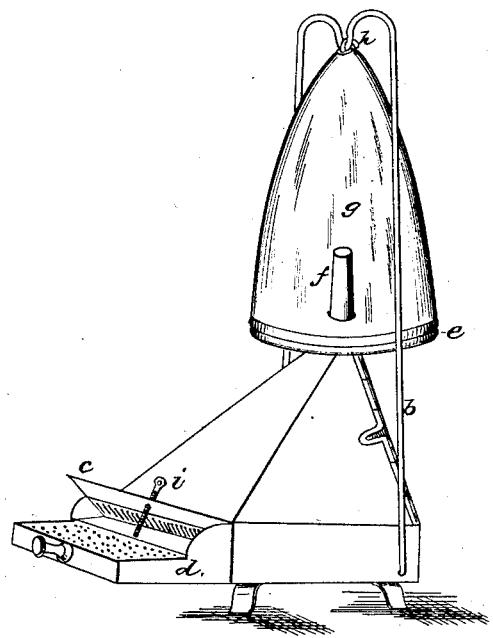
Figure 3:
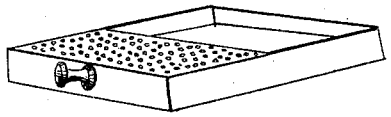
Figure 4:
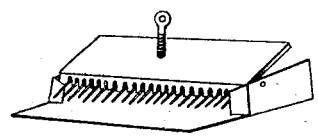

Figures 1 and 2 represent a back and front view of the trap. Fig. 3 represents a sliding drawer, and Fig. 4 represents the triggers.

To enable others to make and use my invention, I will proceed to describe its construction and operation.

I construct a box say 10 by 10 inches, 4 inches deep. From this point the sides and front commence convering, and come to a point on a line with the back part of the trap or box, making a distance of twelve inches from this point to the bottom of the box. This shape facilitates the passage of the flies from the box to the bag. See Figs. 1 and 2. The sliding drawer for the bait $d$, is $1\frac{1}{2}$ inches deep, 9 inches long, and made to suit the width of the box. One third of its length is covered with a perforated top J, which remains on the outside of the box to attract the flies. The triggers $c$ consist of two plates, a set of small pins K, and a regulating screw I.

The bottom plate L, is one and a half inches wide, made very thin, with the ends turned up perpendicularly, to receive the upper plate M, which hangs or works on two pivots N, one at each end.

The upper plate M, is one inch wide, a quarter of an inch thick, and made to fit in the lower plate. It is regularly grooved for the pins K, near enough together to prevent the flies from passing between the pins, which are hung on a pivot P, on the under side of the plate, to prevent the flies from soiling them.

When the trap is set, the outer edge of the upper plate O, is much higher than the inner edge, which throws the points of the pins down at a considerable angle. The pins are hung so as to extend one quarter of an inch over the inner edge of the upper plate Q, to which they are hung. When so arranged, and when set at the proper angle, the lower and inner edge of the plate S, is above the flies, and the only resistance they meet with, is at the points of the pins T, one quarter of an inch farther on, in the direction of the bait.

The trigger can be cast, and made to work much better than those made of wood. Wooden plates are liable to swell and prevent the pins from working. See Fig. 4 of drawing.

Letter $a$ in the drawing represents a glass in the back part of the box, to give light to the same, and conduct the flies to the bag.

Letter $b$ in the drawing represents a wire bent over the back part of the box, (to suit the length of the bag) and attached to its sides to support the bag.

Letter $c$ represents the triggers in the front part of the box above the sliding drawer.

Letter $d$ represents the sliding drawer in the front part of the box below the triggers.

Deter $e$ in the drawings, represents the circle which is made of wood or tin, ten inches in diameter, and one inch thick, with a hole in the center, through which the tube passes.

Letter $f$ represents a tube two inches long and one half inch in diameter, which is permanently attached to the top of the box where the sides and front come together. This prevents the flies from returning to the box.

Letter $g$ represents the bag, which is made to fit the edge of the circle, and which can be tacked or tied on.

Letter $h$ represents a hook at the top of the wire, to hold up the bag.

Set the trap with the glass to the light. Bait once a day with sweetened water or sweetened whisky. Lift off the bag and circle, and destroy the flies with boiling water.

What I claim as my invention, and desire to secure by Letters Patent is—

The shape of the trap, the sliding drawer as herein described, the manner in which the triggers are made as above described, the tube which prevents the flies from returning from the bag to the box, the bag and circle by which the flies are destroyed, by detaching the bag and circle from the box, and the glass on the back part of the box introduced to give light and lead the flies away from the place of entrance to the bag.

WM. RILEY.

Witnesses:
JNO. H. CHEATHAM,
MONTFORT JONES.